United States Patent

Potter et al.

[11] Patent Number: 5,913,465
[45] Date of Patent: Jun. 22, 1999

[54] VEHICLE ARTICLE CARRIER

[75] Inventors: Donald R. Potter, Clarkston; Artur K. Rak, Rochester Hills; Brian E. Henderson, Fraser, all of Mich.

[73] Assignee: JAC Products, Inc., Ann Arbor, Mich.

[21] Appl. No.: 08/960,026

[22] Filed: Oct. 29, 1997

[51] Int. Cl.⁶ ................................................. B60R 9/00
[52] U.S. Cl. .......................................... 224/321; 224/326
[58] Field of Search .................................. 224/309, 321, 224/322, 325, 326, 329, 331

[56] References Cited

U.S. PATENT DOCUMENTS

| | | |
|---|---|---|
| 4,162,755 | 7/1979 | Bott . |
| 4,448,337 | 5/1984 | Cronce ................................... 224/321 |
| 4,500,020 | 2/1985 | Rasor ..................................... 224/321 |
| 4,768,691 | 9/1988 | Stapleton ............................... 224/321 |
| 5,104,020 | 4/1992 | Arvidsson et al. ..................... 224/322 |
| 5,190,198 | 3/1993 | Cucheran . |
| 5,232,138 | 8/1993 | Cucheran ............................... 224/321 |
| 5,385,284 | 1/1995 | Bott . |
| 5,474,217 | 12/1995 | Mandarino et al. . |
| 5,556,016 | 9/1996 | Arvidsson ............................. 224/322 |
| 5,573,161 | 11/1996 | Stapleton . |
| 5,577,650 | 11/1996 | Stapleton . |
| 5,579,970 | 12/1996 | Cucheran et al. . |
| 5,641,107 | 6/1997 | Mann ..................................... 224/331 |
| 5,730,343 | 3/1998 | Settelmayer ........................... 224/331 |
| 5,794,827 | 8/1998 | Cucheran et al. ..................... 224/321 |
| 5,826,765 | 10/1998 | Rak et al. .............................. 224/321 |

FOREIGN PATENT DOCUMENTS 2179901   3/1987   United Kingdom ............... 224/321

*Primary Examiner*—Gregory M. Vidovich
*Attorney, Agent, or Firm*—Harness, Dickey & Pierce, PLC

[57] ABSTRACT

A vehicle article carrier having a pair of bracket members which are disposed on a pair of slats, and where each bracket member includes a rotatable actuating member incorporating a camming mechanism for allowing each bracket member to be quickly and easily placed in locked and unlocked positions relative to its associated slat. Each bracket member includes a camming member which is threadably engaged with a threaded shaft of the actuating member. A locking member is also operably engaged with the camming member and is moved between locked and unlocked positions by movement of the camming member when an operator rotates the actuating member. The apparatus incorporates a limited number of independent component parts and the majority of the component parts are disposed within a housing of the bracket member so as not to be exposed to rain, ice, snow, etc. The bracket members therefore are able to be quickly and easily locked and unlocked relative to their respective slats to allow a cross bar secured to the bracket members to be quickly and easily repositioned along the slats.

20 Claims, 2 Drawing Sheets

1

VEHICLE ARTICLE CARRIER

BACKGROUND OF THE INVENTION

1. Technical Field

This invention relates to a vehicle article carrier, and more particularly to a vehicle article carrier having a pair of bracket members which each incorporate a rotatable actuating member and an internally disposed camming member for causing the bracket members to be locked and unlocked relative to a pair of slats disposed on an outer body surface of the vehicle through operation of a rotational actuating member.

2. Discussion

Vehicle article carriers are used in a wide variety of applications to secure articles above an outer body surface of a vehicle. Such vehicle article carriers often incorporate a pair of bracket members secured to opposite ends of a cross bar. The bracket members are typically mounted on a pair of slats. In some instances, the bracket members may be releasably engageable with the slats to permit the cross bar and the pair of bracket members to be repositioned along the slats as may be needed.

While many forms of locking arrangements have been developed for use with the bracket members of a vehicle article carrier, such locking arrangements have often incorporated a relatively large number of component parts. Furthermore, previously developed locking arrangements have also often proven expensive to manufacture and/or complicated to assemble. In addition, some previously developed locking arrangements have proven to be susceptible to ice and various other elements which can interfere with the operation of such locking mechanisms.

Accordingly, there is a need for a locking mechanism for a bracket member of a vehicle article carrier which is easy for an operator to place in locked and unlocked positions relative to the slats which support the bracket members. Furthermore, there is a need for a vehicle article carrier which is comprised of a limited number of component parts, and which is further easy to assemble and which allows a user to quickly and easily loosen the bracket members relative to their respective slats to permit a cross bar to be quickly and easily repositioned as needed.

SUMMARY OF THE INVENTION

The above and other objects are provided by a vehicle article carrier in accordance with preferred embodiments of the present invention. In one preferred embodiment the vehicle article carrier of the present invention includes a pair of slats which are adapted to be secured to an outer body surface of the vehicle. A pair of bracket members are slidably disposed on the slats. A cross bar is coupled at its two outer ends to the bracket members such that the cross bar is supported above the outer body surface of the vehicle by the bracket members.

In the above-described preferred embodiment, each bracket member includes a camming member and a locking member operably associated with the camming member. An actuating member is also operably associated with the camming member such that rotational movement of the actuating member causes the camming member to be moved within the housing. In particular, when the actuating member is rotated in a first rotational direction, the camming member moves in a manner to urge the locking member into locking engagement with an associated one of the slats which the bracket member is disposed upon. In the locked position the bracket member cannot move relative to the slat. When the actuating member is moved in a second rotational direction opposite to the first rotational direction, the camming member moves such that it causes the locking member to be moved out of locking engagement with its associated slat. The bracket member can then be moved slidably along its slat and repositioned as needed.

In the preferred embodiments the camming member comprises a block of material having a threaded bore extending at least partially therethrough. The actuating member comprises an elongated, threaded shaft which is threadably engaged within the threaded bore. Accordingly, rotational movement of the actuating member causes the camming member to move within the housing.

The preferred embodiments of the present invention thus enable a bracket member to be constructed having relatively few independent component parts. This reduces the manufacturing cost of the bracket member as well as simplifying its assembly. Since the camming member and a major portion of the locking member are disposed within the housing, they are not susceptible to the elements which could affect other forms of locking mechanisms which are exposed to ice, rain, etc. The actuating member further enables the user to quickly and easily place the bracket member in locked and unlocked positions with a minimal degree of manual effort.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
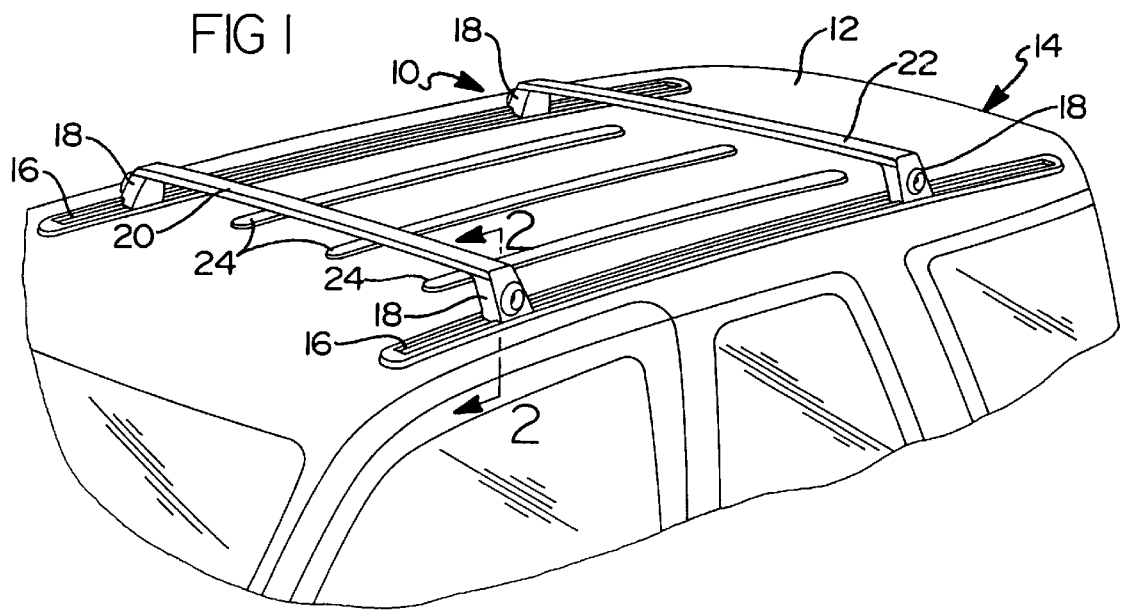
FIG. 1 is a perspective view of a portion of a vehicle incorporating a vehicle article carrier in accordance with a preferred embodiment of the present invention.

Referring to FIG. 1, there is shown a vehicle article carrier 10 in accordance with a preferred embodiment of the present invention mounted on an outer body surface 12 of the vehicle 14. The vehicle article carrier 10 includes a pair of elongated slats 16 which are fixedly secured to the outer body surface 12, bracket members 18 and cross bars 20 and 22. It will be appreciated immediately, however, that while both of cross bars 20 and 22 are adjustably positionable along the slats 16, that one or the other of the cross bars 20, 22 could just as easily be fixedly secured to the slats 16 so as to be immovable. In some applications this may be the preferred arrangement.

With further reference to FIG. 1, the vehicle article carrier 10 may optionally include a plurality of intermediate slats 24 fixedly secured to the outer body surface 12 to further help insure that articles placed on the cross bars 20 and 22 do not contact the outer body surface 12. Each of the cross bars 20 and 22 are slidably movable along the slats when its associated bracket members 18 are both in unlocked positions, as will be described in greater detail momentarily.

Figure 2:
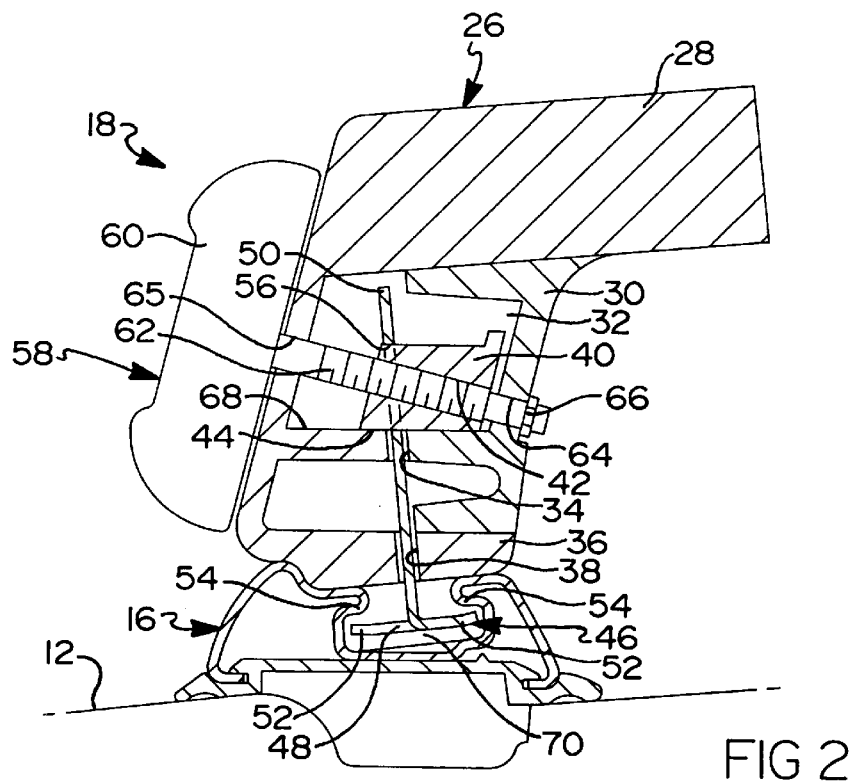
FIG. 2 is a partial side cross sectional view of one bracket member and a portion of its associated slat in accordance with section line 2—2 in FIG. 1, showing the bracket member in an unlocked position.

Referring to FIG. 2, each bracket member 18 can be seen to include a housing 26 comprising a main housing portion 28 and an inner housing portion 30. When assembled together, the housing portions 26 and 30 permit a cavity 32 to be formed within the housing 26. The two housing portions 26 and 30 also permit an opening 34 to be formed which communicates with the cavity 32. A base portion 36 of the housing portion 28 also includes an opening 38 formed therein generally in alignment with the opening 34.

Figure 5:
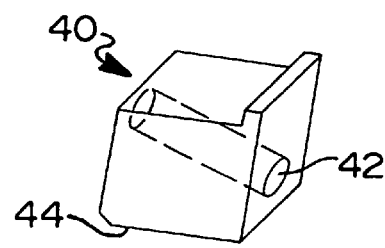
FIG. 5 is a perspective view of the camming member.

With further reference to FIG. 2, within the cavity 32 is disposed a camming member 40. The camming member is also shown in FIG. 5. With specific reference to FIG. 5, the camming member generally comprises a square-shaped solid block of plastic having a threaded bore 42 extending therethrough. The bore 42 extends at an angle relative to a bottom wall 44 of the camming member such that the bore is non-parallel or divergent from the bottom wall 44. The camming member 40 may be injection molded from a suitably high strength plastic or may be formed from other suitable materials such as powdered metal.

Figure 4:
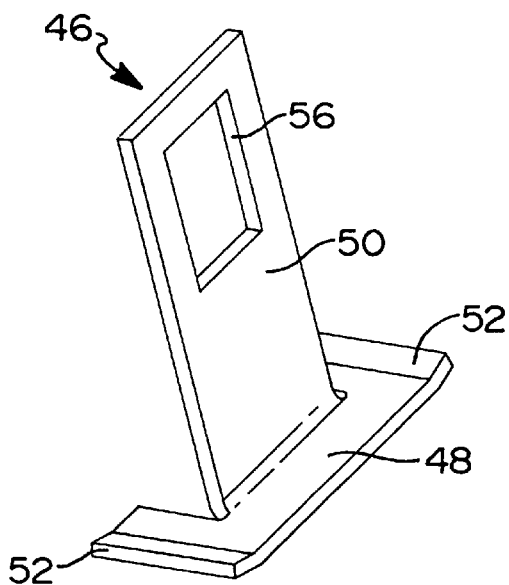
FIG. 4 is a perspective view of the locking member.

With further reference to FIG. 2, a locking member 46 extends into the cavity 32 through the opening 34 and through the opening 38 in the base portion 36 of the housing 26. The locking member 46 is also illustrated in FIG. 4 and is formed by a T-shaped member including a clamping portion 48 and a neck portion 50. The clamping portion 48 includes curved end portions 52 which are adapted to engage with interior surface portions of ledges 54 of the slat 16 (visible in FIG. 2). The neck portion 50 includes an opening 56 formed therein which is of suitable dimensions to permit the camming member 40 to extend into the opening 56 during assembly of the apparatus 10. The locking member 46 is preferably formed from a single piece of steel or other suitably strong material.

With further reference to FIG. 2, the bracket member 18 also includes an actuating member 58 comprising a manually graspable, dial-like member 60 and an elongated, threaded member 62 fixedly secured to member 60 and extending through an opening 65 in the housing portion 28. The threaded member 62 is threadably engaged within the threaded bore 42 of the camming member 40 during assembly and also preferably extends through an opening 64 in the inner housing portion 30. The threaded member 60 is secured to the housing 26 by a snap ring 66 or any other suitable means for preventing the actuating member 58 from being accidentally pulled outwardly of the housing 26. When assembled and in the unlocked position shown in FIG. 2, the bottom wall 44 of the camming member 40 rests against a floor 68 of the cavity 32 or closely adjacent thereto. The clamping portion 48 resides within a channel 70 of the slat 16 and is not in contact with the interior surface portions of the channel 70 so that the bracket member 18 can be moved freely slidably along the slat 16.

Figure 3:
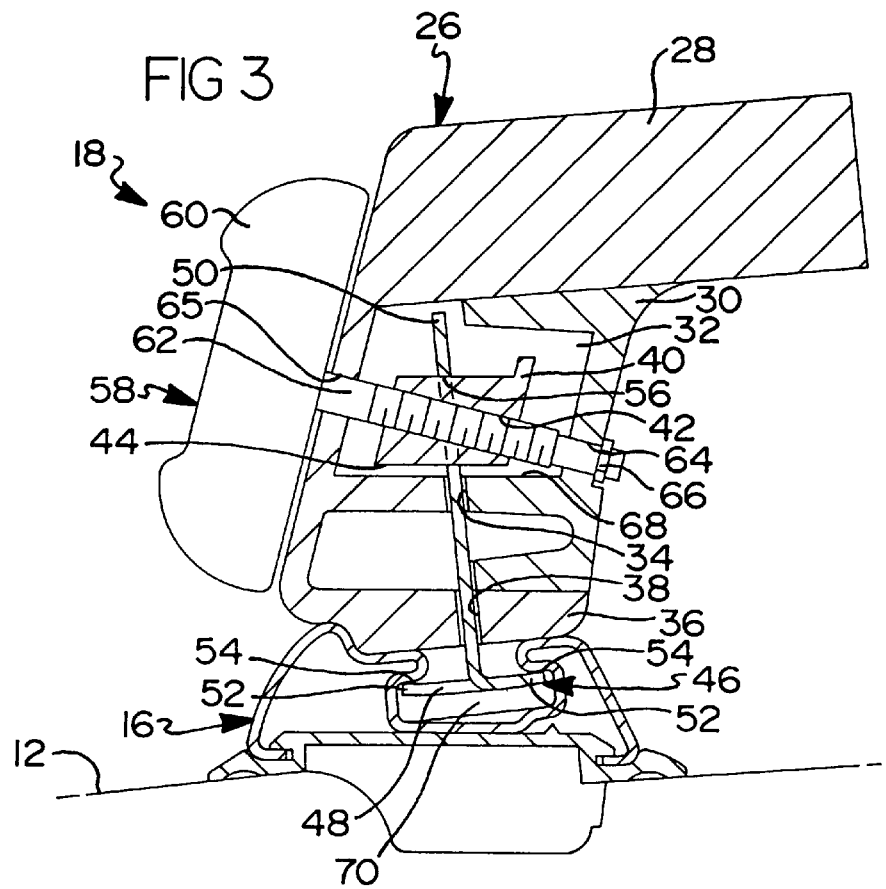
FIG. 3 is a view of the bracket member of FIG. 2 showing the bracket member in a locked position.

Referring to FIG. 3, the clamping member 46 is moved into the locked position shown in FIG. 3 by manually grasping the dial-like member 60 and rotating same. This causes the camming member 40 to be displaced or moved vertically as well as horizontally within the cavity 32. In the drawing of FIG. 3, the camming member 40 moves upwardly and to the left when the dial-like member 60 is rotated in a first or locking direction. The upward movement of the camming member 40 lifts the locking member 46 such that the clamping portion 48 engages the ledges 54 of the slat 16. Rotating the dial-like member 60 in a second or opposite rotational direction to the first direction causes the camming member 40 to be moved downwardly into the unlocked position shown in FIG. 2. Accordingly, by simply grasping the dial-like member 60 and rotating this member in one rotational direction or the other, the bracket member 18 can quickly and easily be placed in locked and unlocked positions. Since the camming member 40 and the threaded shaft 62 are disposed within the housing 26 they are not subject to ice, rain, etc. which could, over time, affect their operation.

With further reference to FIG. 3, assembly of the bracket member 18 is accomplished by first inserting the neck portion 50 of the locking member 46 through the opening 38 in the base portion 36 of the main housing 28. Next, the threaded shaft 62 of the actuating member 58 is inserted through the opening 65 and through the opening 56 in the locking member 46. The threaded shaft 62 is then threadably advanced through the camming member 40 until the camming member 40 is in the position shown in FIG. 2 and extends through the opening 56 and through opening 64 in the inner housing portion 30. At this point the inner housing portion 30 is secured to the threaded member 62 via the snap ring 66 or by other means.

The bracket members 18 of the apparatus 10 thus include a limited number of component parts and can be placed in locked and unlocked positions quickly and easily with a minimal degree of manual effort by an operator. The major component parts are primarily disposed within the housing 26 of the bracket member 18 and are therefore not subjected to ice, rain, snow and other elements which could impede their operation over time.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vehicle article carrier apparatus for supporting articles elevationally above an outer body surface of a vehicle, said apparatus comprising:

a pair of slats adapted to be secured to said outer body surface;

a cross bar;

a pair of bracket members slidably supported on said slats and disposed at opposite ends of said cross bar for supporting said cross bar on said slats above said outer body surface;

each of said bracket members comprising:

a housing;

a camming member disposed for generally horizontal movement within said housing;

a locking member operably associated with said camming member such that said camming member is moveable slidably relative to said locking member, and wherein said locking member is lockably engageable with an associated one of said slats, and adapted to be moved within a generally vertical plane by said camming member as said camming member is moved generally horizontally within said housing between locked and unlocked positions relative to said associated one of said slats; and an enlarged, manually graspable rotatable actuating member operably associated with said housing so as to be manually engageable by an operator, said actuating member having an elongated member operably associated with said camming member so as to move said cramming member generally horizontally between first and second positions, said first position enabling said locking member to reside in said unlocked position and said camming member causing said locking member to move generally perpendicularly relative to said camming member, thereby urging said locking member into said locked position as said camming member is moved into said second position by rotational movement of said actuating member.

2. The apparatus of claim 1, wherein said locking member comprises a T-shaped locking member having a clamping portion and a neck portion, said neck portion including an opening formed therein adapted to receive said camming member.

3. The apparatus of claim 1, wherein said camming member comprises a solid block of material generally formed in the shape of a square and having a bore extending therethrough; and wherein said bore is adapted to receive said elongated member.

4. The apparatus of claim 2, wherein said locking member further comprises a pair of curved end portions for engaging with portions of an associated one of said slats.

5. The apparatus of claim 3, wherein said bore of said camming member is disposed at an angle so as to extend non-parallel to a bottom wall of said camming member.

6. The apparatus of claim 1, wherein said elongated member comprises a threaded elongated member; and wherein said camming member comprises a camming block having a bore extending therethrough, said bore being threaded so as to threadably engage with said threaded elongated member; and wherein said locking member comprises an opening through which said camming block extends such that rotational movement of said actuating member causes said threaded elongated member to displace said camming block horizontally and vertically within said housing, thus enabling said locking member to be moved between said locked and unlocked positions.

7. The apparatus of claim 1, wherein said camming member is formed from a solid section of plastic.

8. A vehicle article carrier apparatus for supporting articles elevationally above an outer body surface of a vehicle, said apparatus comprising:

a pair of slats adapted to be secured to said outer body surface;

a cross bar;

a pair of bracket members slidably supported on said slats and disposed at opposite ends of said cross bar for supporting said cross bar on said slats above said outer body surface;

each of said bracket members comprising:

a housing having a cavity;

a camming block disposed within said cavity, said camming block having a threaded bore extending therethrough;

a locking member operably associated with said camming block such that said camming block is movable slidably relative to said locking member, said locking member including a clamping portion adapted to clampingly engage with an associated one of said slats when said locking member is in a locked position, and to be positioned out of contact with said associated one of said slats when said locking member is in an unlocked position; and a rotatable actuating member operably associated with said housing so as to be manually engageable by an operator, said actuating member having an elongated, threaded member threadably engaged within said threaded bore of said camming block to move said camming block within said housing to urge said clamping portion of said locking member generally linearly, in a direction generally perpendicular to movement of said camming block, into locking engagement with said associated slat when said actuating member is rotated in a first direction, and to move said camming block within said housing such that said clamping portion of said locking member is urged generally linearly out of clamping engagement with said associated slat when said actuating member is rotated in a second direction opposite to said first direction.

9. The apparatus of claim 8, wherein said locking member comprises a neck portion having an opening, said camming block extending through said opening.

10. The apparatus of claim 8, wherein said threaded bore of said camming block extends non-parallel to a bottom wall of said camming block to cause said camming block to be displaced vertically and laterally within said cavity when said actuating member is rotated in said first and second directions.

11. The apparatus of claim 8, wherein said camming block comprises a solid block of plastic.

12. A vehicle article carrier apparatus for supporting articles elevationally above an outer body surface of a vehicle, said apparatus comprising:

a pair of slats adapted to be secured to said outer body surface;

a cross bar for supporting articles thereon;

a pair of bracket members disposed on said slats and coupled to outer ends of said cross bar for supporting said cross bar elevationally above said outer body surface of said vehicle;

each of said bracket members comprising:

a housing having an opening at a lower end thereof;

a locking member projecting from said housing outwardly of said opening and engageable with a portion of an associated one of said slats to clamp said bracket member to said associated slat;

a camming member engaged with a portion of said locking member within said housing and for sliding movement generally perpendicularly relative to said locking member, said camming member including a threaded bore extending at least partially therethrough; and a manually graspable actuating member adapted to be engaged with the fingers of one hand of an individual, and having an elongated, threaded member adapted to threadably engage with said threaded bore of said camming member such that rotational movement of said actuating member in a first rotational direction causes vertical and horizontal movement of said camming member within said housing, thereby causing said locking member to move generally linearly from a locked position to an unlocked position, and wherein rotational movement of said actuating member in a second rotational direction opposite to said first rotational direction causes said locking member to move generally linearly from said unlocked position into said locked position.

13. The apparatus of claim 12, wherein said locking member comprises a clamping portion adapted to clampingly engage with a portion of said associated slat, and a neck portion having an opening therein, said opening accepting at least a portion of said camming member.

14. The apparatus of claim 12, wherein said camming member comprises a solid block of plastic.

15. The apparatus of claim 12, wherein an end of said elongated threaded member is secured to said inner housing portion to prevent removal of said elongated threaded member from said housing.

16. A vehicle article carrier apparatus for supporting articles elevationally above an outer body surface of a vehicle, said apparatus comprising:

a pair of slats adapted to be secured to said outer body surface, each said slat having a channel formed therein;

a cross bar for supporting articles thereon above said outer body surface;

a pair of bracket members slidably supported on said slats and disposed at opposite ends of said cross bar for supporting said cross bar on said slats above said outer body surface;

each of said bracket members comprising:

a housing comprising a main housing portion and an inner housing portion defining a cavity therebetween;

a camming member disposed for generally horizontal movement within said cavity of said housing;

a locking member having a neck portion projecting into said cavity and a clamping portion extending outwardly of said housing into said channel of an associated one of said slats, said neck portion having an opening formed therein for receiving said camming member;

said camming member further including a threaded bore extending at least partially therethrough and being movable slidably relative to said locking member;

an actuating member having an elongated, threaded member in threaded engagement with said threaded bore of said camming member;

said actuating member being manually rotatable in a first direction to cause said camming member to be moved slidably generally horizontally within said cavity, thereby urging said locking member in a first direction into locking engagement with said channel of said associated slat; and said actuating member further being rotatable in a second direction opposite to said first direction to cause said camming member to be moved vertically and laterally within said cavity, thereby causing said locking member to be urged out of clamping engagement with said channel of said associated slat.

17. The apparatus of claim 16, wherein said bore in said camming member extends generally non-parallel to a bottom wall of said camming member.

18. The apparatus of claim 16, wherein said camming member comprises a generally square-shaped plastic member; and wherein said bore in said camming member extends completely through said camming member.

19. The apparatus of claim 16, wherein said locking member comprises a T-shaped member having a pair of curved end portions adapted to engage within said channel of said associated slat.

20. A vehicle article carrier apparatus for supporting articles elevationally above an outer body surface of a vehicle, said apparatus comprising:

a pair of slats adapted to be secured to said outer body surface;

a cross bar for supporting articles thereon;

a pair of bracket members disposed on said slats and coupled to outer ends of said cross bar for supporting said cross bar elevationally above said outer body surface of said vehicle;

each of said bracket members comprising:

a housing having an opening at a lower end thereof;

a locking member projecting from said housing outwardly of said opening and engageable with a portion of an associated one of said slats to clamp said bracket member to said associated slat;

a camming member engaged with a portion of said locking member within said housing, said camming member including a threaded bore extending at least partially therethrough; and a manually engageable actuating member having an elongated, threaded member adapted to threadably engage with said threaded bore of said camming member such that rotational movement of said actuating member in a first rotational direction causes vertical and horizontal movement of said camming member within said housing, thereby causing said locking member to move from a locked position to an unlocked position, and wherein rotational movement of said actuating member in a second rotational direction opposite to said first rotational direction causes said locking member to move from said unlocked position into said locked position;

wherein said housing comprises a main housing portion and an independent inner housing portion secured to said main housing for encapsulating said camming member within said housing.

* * * * *